(12) United States Patent
Hsieh et al.

(10) Patent No.: US 10,775,825 B2
(45) Date of Patent: Sep. 15, 2020

(54) ADAPTER CABLE, ADAPTER MODULE, AND METHOD OF OPERATING THE SAME

(71) Applicant: DELTA ELECTRONICS, INC., Taoyuan (TW)

(72) Inventors: Hung-Sheng Hsieh, Taoyuan (TW); Yueh-Feng Cheng, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 16/149,808

(22) Filed: Oct. 2, 2018

(65) Prior Publication Data
US 2019/0250658 A1    Aug. 15, 2019

(30) Foreign Application Priority Data

Feb. 13, 2018 (TW) ............................ 107105169 A

(51) Int. Cl.
*G06F 1/26* (2006.01)
*G05F 3/02* (2006.01)
(Continued)

(52) U.S. Cl.
CPC .................. *G05F 3/02* (2013.01); *G06F 1/26* (2013.01); *G06F 1/266* (2013.01); *H02J 7/04* (2013.01); *H02J 7/00* (2013.01)

(58) Field of Classification Search
CPC ...... G05F 3/02; G05F 3/08; G06F 1/26–3296; G06F 13/4282; G06F 13/38–40; G06F 2213/0042; H02J 7/0021; H02J 7/0045; H02J 7/0052; H02J 7/0095; H02J 7/0096; H02J 7/0098; H02J 2007/0062; H02J 2007/0096; H02J 50/80; H02J 7/00; H02J 7/04–045; H02J 7/00032–00045

USPC ........ 323/271–275, 281–286, 299, 318, 351; 363/15–21.18, 74, 78, 79, 142–148; 713/300–340
See application file for complete search history.

(56) References Cited

U.S. PATENT DOCUMENTS

2005/0162020 A1    7/2005  Lanni
2013/0290765 A1*   10/2013 Waters .................. G06F 1/266
                                                          713/340
(Continued)

FOREIGN PATENT DOCUMENTS

| EP | 1555733 A2 | 7/2005 |
| TW | 201701578 A | 1/2017 |
| TW | 201739138 A | 11/2017 |

OTHER PUBLICATIONS

Montag, B. et al: "USB Power Delivery Specification Revision 1.0", Jul. 5, 2012, XP055551059, Retrieved from the Internet: URL:http://caxapa.ru/thumbs/342141/USB_PD_V1_0-20120705-final.pdf, 303 pages.

*Primary Examiner* — Thienvu V Tran
*Assistant Examiner* — Carlos O Rivera-Perez
(74) *Attorney, Agent, or Firm* — Muncy, Geissler, Olds & Lowe, P.C.

(57) ABSTRACT

An adapter module includes an adapter unit and an adapter cable. The adapter unit includes a control unit, and the adapter cable includes a data transmission line and a voltage control unit. The control unit is a power delivery controller. The control unit receives a reference voltage provided from the voltage control unit through a data transmission terminal, and the control unit controls the adapter unit to provide a fixed voltage to a load according to the reference voltage.

20 Claims, 12 Drawing Sheets

(51) Int. Cl.
*H02J 7/04* (2006.01)
*H02J 7/00* (2006.01)

(56) References Cited

U.S. PATENT DOCUMENTS

| | | |
|---|---|---|
| 2014/0372776 A1* | 12/2014 | Yang .......................... G06F 1/26 |
| | | 713/300 |
| 2015/0180355 A1 | 6/2015 | Freeman et al. |
| 2017/0038810 A1* | 2/2017 | Ueki ....................... G06F 21/44 |
| 2017/0170734 A1 | 6/2017 | Sheng et al. |
| 2017/0310129 A1 | 10/2017 | Chang et al. |

\* cited by examiner

ADAPTER CABLE, ADAPTER MODULE, AND METHOD OF OPERATING THE SAME

BACKGROUND

Technical Field

The present disclosure relates to an adapter cable, an adapter module, and a method of operating the same, and more particularly to an adapter cable, an adapter module, and a method provided for a power delivery controller to control an adapter unit to output a fixed voltage value or an adjustable voltage value.

Description of Related Art

The statements in this section merely provide background information related to the present disclosure and do not necessarily constitute prior art.

The controller in the new-type adapter is used to provide the output voltage with different voltage values depended on the demand of the load, such as the notebook computer, the aforementioned function is called a power deliver (PD) function. However, the adapter with the PD function is not applicable to loads that receive the output voltage with only the fixed voltage value. Therefore, the specification of the new-type adapter is difficult and unsuitable to apply to the conventional adapter. In particular, the new adapter fails to charge the loads which can only receive the fixed-value voltage so that the usage and selection of the adapter is limited to the loads in order to normally charge the loads by the selected adapter. Moreover, unnecessary waste and environmental problems may arise due to the above-mentioned limitation.

SUMMARY

According to an aspect of the present disclosure, an adapter module is provided to couple to a load and supply power to the load. The adapter module includes an adapter unit and an adapter cable. The adapter unit includes a control unit. The control unit has a data transmission terminal, and the control unit is a power delivery controller. The adapter cable includes a data transmission line and a voltage control unit. The data transmission line is coupled to the data transmission terminal. The voltage control unit is coupled to the data transmission line, and provides a reference voltage. The control unit receives the reference voltage through the data transmission terminal and controls the adapter unit to provide a fixed voltage to the load according to the reference voltage.

In one embodiment, the control unit further sets a transmission time and controls the adapter unit to provide the fixed voltage to the load after the transmission time has expired.

In one embodiment, the data transmission line is coupled to the load, and the control unit further detects a communication signal through the data transmission terminal and controls the adapter to: a) if the communication signal is not received by the control unit, provide the fixed voltage to the load according to the reference voltage; and b) if the communication signal is received by the control unit, provide an adjustable voltage to the load.

In one embodiment, one end of the adapter cable is a Type-C connection port and the data transmission line is coupled to the data transmission terminal through the Type-C connection port.

In one embodiment, the adapter cable further includes a voltage regulation unit. The voltage regulation unit regulates a voltage value of the reference voltage.

In one embodiment, the adapter unit further includes a voltage source and a voltage division unit. The voltage division unit is coupled to the voltage source and the data transmission terminal, the voltage source provides voltages across the voltage division unit and the voltage control unit, and the reference voltage is the voltage across the voltage control unit.

According to an aspect of the present disclosure, an adapter cable is provided. The adapter cable includes a data transmission line and a voltage control unit. The data transmission line couples to an adapter unit. The voltage control unit is coupled to the data transmission line, and the voltage control unit provides a reference voltage for use by the adapter unit to instruct an output of a fixed voltage to the load.

In one embodiment, one end of the adapter cable is a Type-C connection port to couple the data transmission line to the adapter unit through the Type-C connection port.

In one embodiment, the adapter cable further includes a voltage regulation unit. The voltage regulation unit is coupled to the voltage control unit, and the voltage regulation unit regulates a voltage value of the reference voltage.

In one embodiment, the reference voltage is a voltage across the voltage control unit.

According to an aspect of the present disclosure, a method of operating an adapter module is provided. The method includes steps of: (a) coupling an adapter cable to an adapter unit and a load; (b) providing a reference voltage by a voltage control unit of the adapter cable, wherein the reference voltage is a voltage across the voltage control unit; (c) receiving, by a control unit of the adapter unit, the reference voltage through a data transmission terminal, wherein the control unit is a power delivery controller; and (d) determining, by the control unit, to provide a fixed voltage to the load according to the reference voltage, or to provide an adjustable voltage to the load.

In one embodiment, step (d) further includes: (d-1) setting, by the control unit, a transmission time; and (d-2) providing the fixed voltage to the load after the transmission time has expired.

In one embodiment, step (d) further includes: (d-i) detecting, by the control unit, if a communication signal is received by the control unit; (d-ii) if the communication signal is not received by the control unit, providing the fixed voltage to the load according to the reference voltage; and (d-iii) if the communication signal is received by the control unit, providing the adjustable voltage to the load according to the communication signal.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
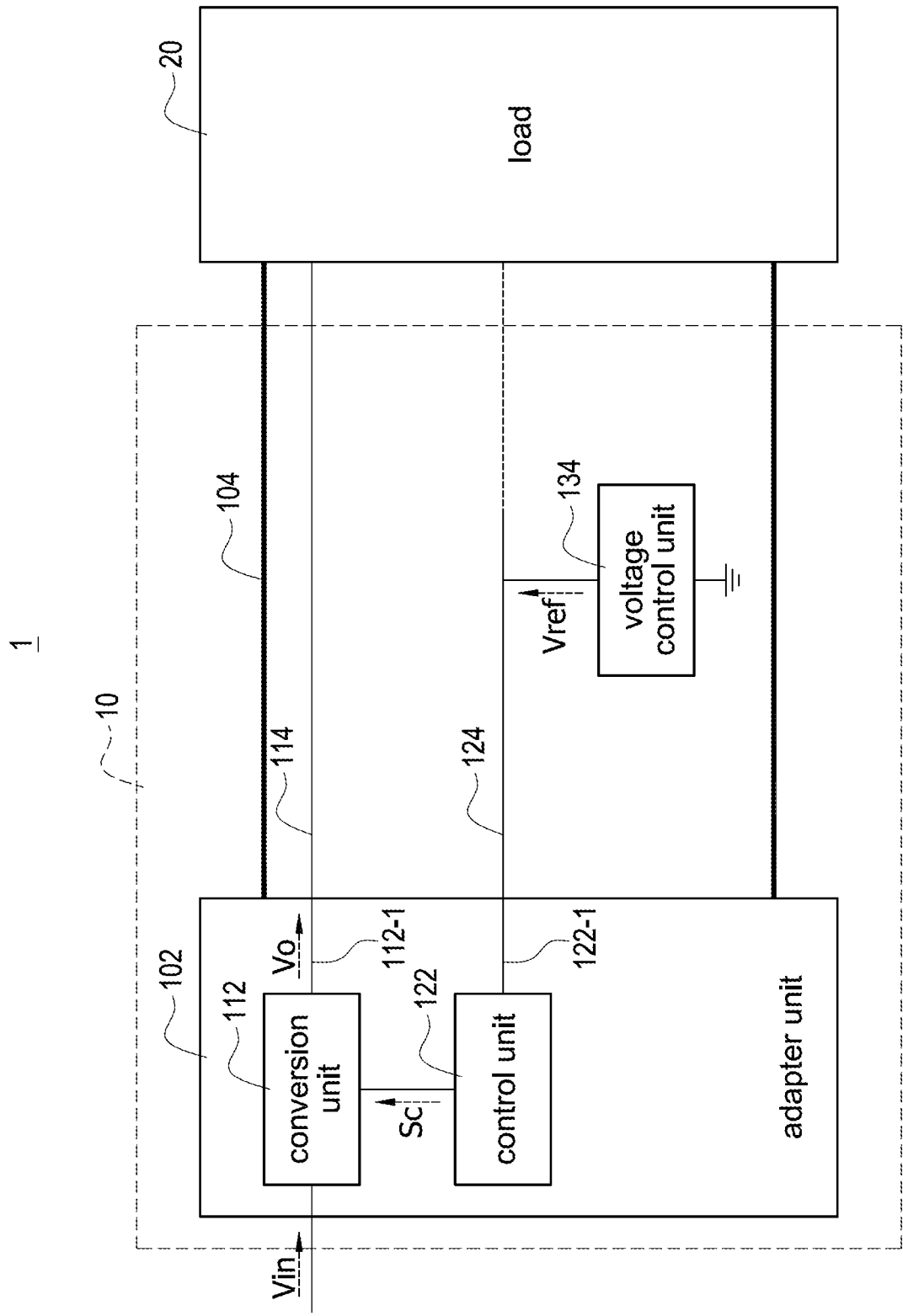
FIG. 1 is a schematic block diagram of an adapter system according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a schematic block diagram of an adapter system according to the present disclosure. The adapter system 1 includes an adapter module 10 and a load 20, and the adapter module 10 is provided to supply power to the load 20. The adapter module 10 includes an adapter unit 102 and an adapter cable 104, and the adapter cable 104 is coupled to the adapter unit 102 and the load 20. The adapter unit 102 includes a conversion unit 112 and a control unit 122. The conversion unit 112 converts an input voltage Vin into an output voltage Vo, and the output voltage Vo is outputted from an output terminal 112-1 of the conversion unit 112. The control unit 122 outputs a control signal Sc to control the conversion unit 112 to convert the input voltage Vin into the output voltage Vo.

The adapter cable 104 includes an output bus line 114, a data transmission line 124, and a voltage control unit 134. The output bus line 114 is coupled between the output terminal 112-1 of the conversion unit 112 and the load 20. The data transmission line 124 is coupled between a data transmission terminal 122-1 of the control unit 122 and the voltage control unit 134, and the voltage control unit 134 is grounded. More specifically, the voltage control unit 134 provides a reference voltage Vref and transmits the reference voltage Vref to the control unit 122 through the data transmission line 124. The control unit 122 receives the reference voltage Vref through the data transmission terminal 122-1 to control the conversion unit 112 to provide the output voltage Vo with a fixed voltage value to the load 20 according to the reference voltage Vref.

In one embodiment, the control unit 122 is a power delivery (PD) controller, and meets the specifications of the USB power delivery communication protocol. At this condition, the PD controller, namely the control unit 122, communicates with the load 20 through the data transmission line 124 to realize that the required voltage value of the output voltage Vo for the load 20, and therefore the PD controller controls the conversion unit 112 to convert and provide the required voltage value of the output voltage Vo to the load 20 through the output bus line 114. When the PD controller fails to communicate with the load 20, the PD controller does not control the adapter unit 102 to provide output the output voltage Vo. Therefore, the control unit 122 can provide the output voltage Vo with the fixed voltage value to the load 20 under the absence of the communication between the control unit 122 and the load 20 since the reference voltage Vref outputted from the voltage control unit 134 is provided to the control unit 122 which meets the specifications of the USB power delivery communication protocol.

Figure 2A:
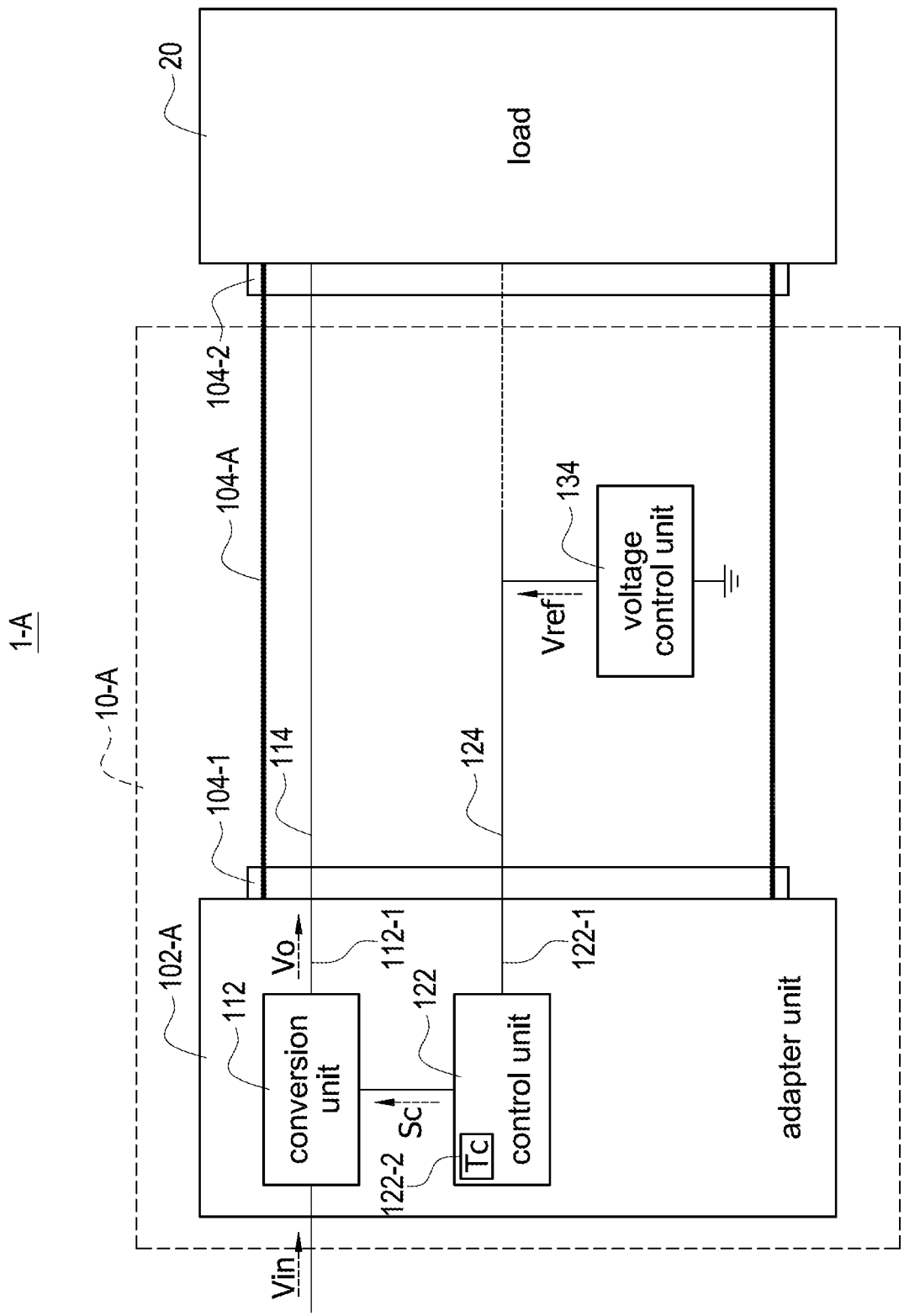
FIG. 2A is a schematic block diagram of an adapter module for supplying power to a load according to a first embodiment of the present disclosure.

Please refer to FIG. 2A, which shows a schematic block diagram of an adapter module for supplying power to a load according to a first embodiment of the present disclosure. Also refer to FIG. 1. One end of the adapter cable 104-A is a Type-C connection port 104-1, and the Type-C connection port 104-1 is coupled to the adapter unit 102-A. Therefore, the output bus line 114 line is coupled to the output terminal 112-1 through the Type-C connection port 104-1, and the data transmission line 124 is coupled to the data transmission terminal 122-1 through the Type-C connection port 104-1. In this embodiment, the data transmission line 124 is not limited to be coupled to the load 20, and therefore a dashed line is represented to indicate that the data transmission line 124 may be optionally coupled to the load 20.

The control unit 122 sets a transmission time Tc by firmware or a setting unit 122-2, and the transmission time Tc meets the specifications of the USB power delivery communication protocol, such as but not limited to 200 microseconds. In one embodiment, the adapter cable 104-A includes at least two connection ports, and any one of the at least two connection ports, such as the Type-C connection port 104-1 is coupled to the adapter unit 102. In one embodiment, the transmission time Tc is not limited to 200 microseconds, that is, the transmission time, which meets the specifications of the USB power delivery communication protocol, can be used as the transmission time Tc of the present disclosure.

More specifically, the voltage control unit 134 continuously provides the reference voltage Vref to the control unit 122. When the load 20 is coupled to the adapter module 10-A, the control unit 122 communicates with the load 20 through the data transmission line 124. For example, the control unit 122 may provide the required voltage of the load 20 or query the load 20 what is the required voltage. At this condition, the voltage control unit 134 still provides the reference voltage Vref, such as 1.7 volts to the control unit 122. After the transmission time Tc, which meets the specifications of the USB power delivery communication protocol, has expired, the control unit 122 outputs the control signal Sc according to the reference voltage Vref, such as 1.7 volts provided from the voltage control unit 134 when the control unit 122 does not still acquire the response from the load 20. When the conversion unit 112 receives the control signal Sc outputted from the control unit 122, the conversion unit 112 converts the input voltage Vin into the output voltage Vo with the fixed voltage value, such as 19.5 volts according to the control signal Sc. The output bus line 114 transmits the output voltage Vo with the fixed voltage value to the load 20 so that the load 20 can obtain the required voltage outputted from the adapter module 10-A even if the load 20 does not have the function of USB power delivery communication protocol.

In one embodiment, the voltage control unit 134 may be an active voltage control unit. More specifically, the voltage control unit 134 is, for example but not limited to, an active voltage source, an active power supply unit, or an active switch switching circuit. Therefore, the accurate voltage value of the reference voltage Vref can be provided and the voltage value of the reference voltage Vref is not easily affected by external interference, such as the line coupling effect or the electromagnetic interference. Moreover, in one embodiment, the type of a connection port 104-2 of the load 20 coupled to the adapter cable 104-A is not limited, that is, the connection port 104-2 may be, for example but not limited to, a Type-A connection port, Type-B connection port, HDMI connection port, or so on.

Figure 2B:
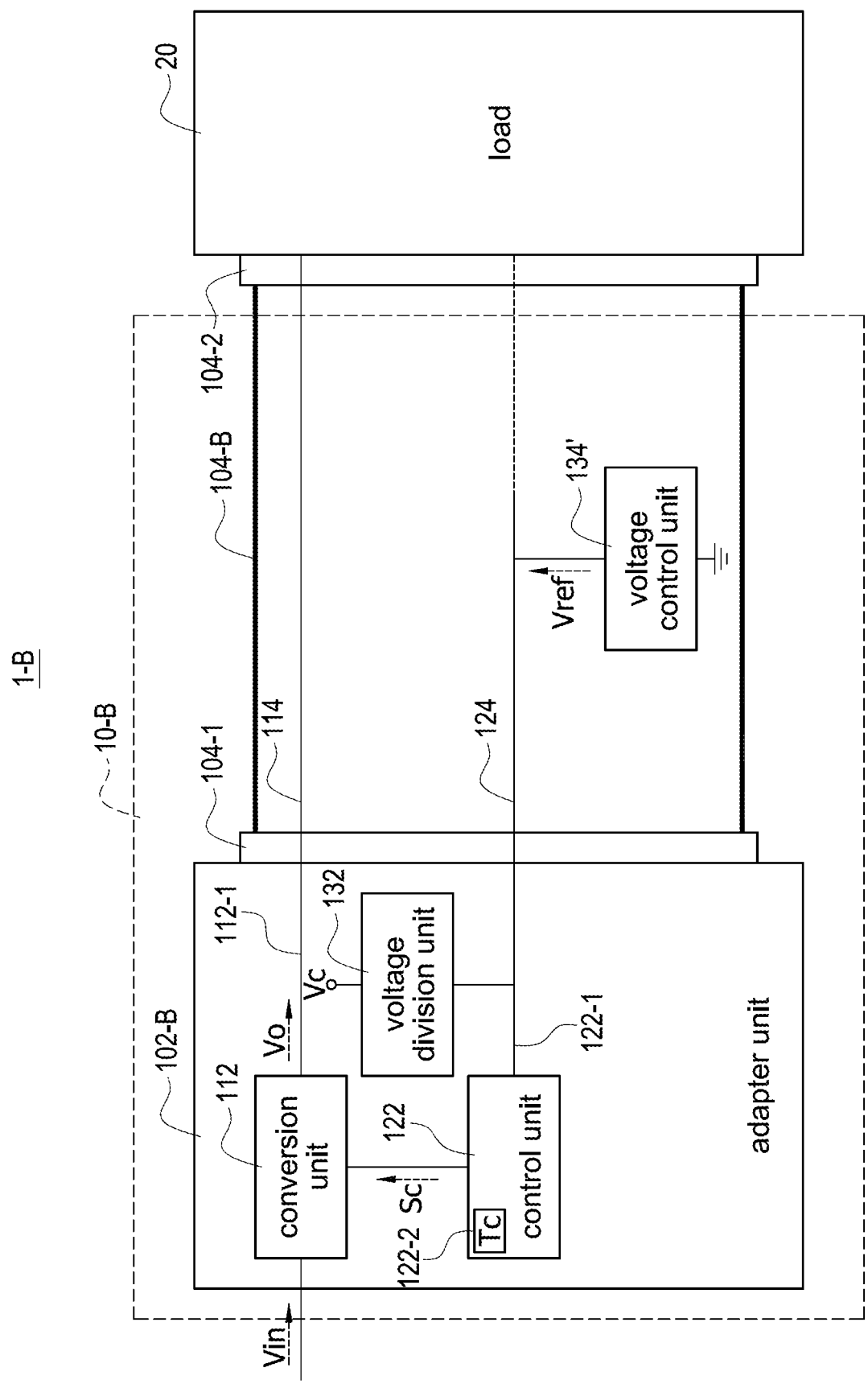
FIG. 2B is a schematic block diagram of the adapter module for supplying power to the load according to a second embodiment of the present disclosure.

Please refer to FIG. 2B, which shows a schematic block diagram of the adapter module for supplying power to the load according to a second embodiment of the present disclosure. Also refer to FIG. 1 to FIG. 2A. The difference between the adapter module 10-B shown in FIG. 2B and the adapter module 10-A shown in FIG. 2A is that the adapter unit 102-B includes a voltage source Vc and a voltage division unit 132. The voltage division unit 132 is coupled to the voltage source Vc and the data transmission terminal 122-1. The voltage control unit 134' is a passive voltage control unit, such as but not limited to a resistor. Based on the connection structure of the voltage division unit 132 and the voltage control unit 134', the voltage source Vc provides voltages across the voltage division unit 132 and the voltage control unit 134', respectively. The voltage across the voltage control unit 134' is the reference voltage Vref. The control unit 122 produces a control signal Sc according to the voltage across the voltage control unit 134', namely the reference voltage Vref to control the conversion unit 112 to convert an input voltage Vin into an output voltage Vo with a fixed voltage value. Further, the passive voltage control unit 134' (such as but not limited to a resistor) of the adapter module 10-B is used to produce the reference voltage Vref, and therefore to reduce the cost of components to achieve the cost savings of the overall adapter module. The detail description of other components and control manners like in FIG. 2A is not repeated here for the sake of brevity. In one embodiment, the voltage division unit 132 or the voltage control unit 134' may be a resistor, that is, a passive component, which can provide a voltage across the voltage control unit 134' as the reference voltage Vref according to the voltage division principle, may be used as the voltage division unit 132 and/or the voltage control unit 134'.

Figure 2C:
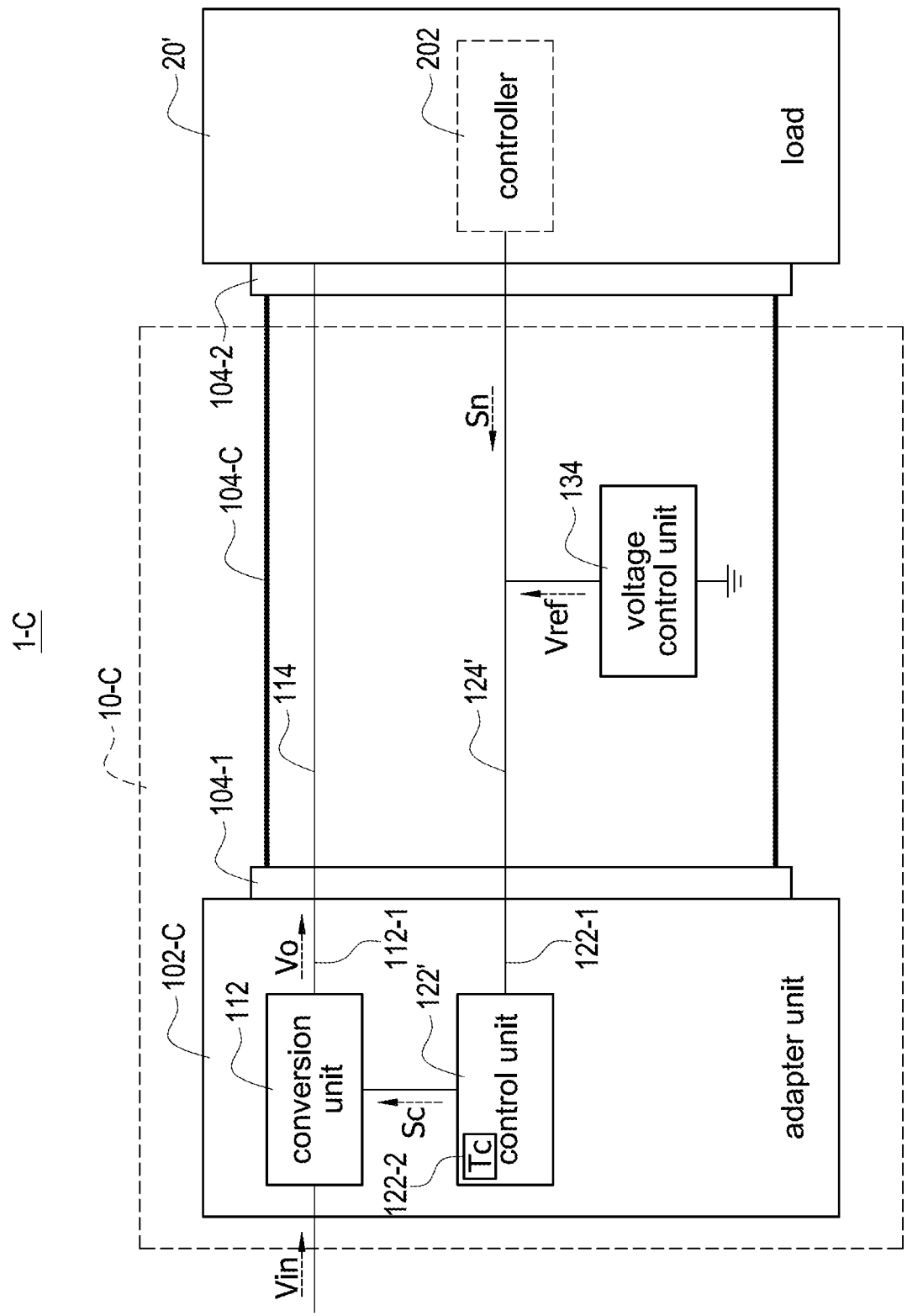
FIG. 2C is a schematic block diagram of the adapter module for supplying power to the load according to a third embodiment of the present disclosure.

Please refer to FIG. 2C, which shows a schematic block diagram of the adapter module for supplying power to the load according to a third embodiment of the present disclosure. Also refer to FIG. 1 to FIG. 2B. The difference between the adapter module 10-C shown in FIG. 2C and the adapter module 10-A shown in FIG. 2A is that the data transmission line 124' is coupled between the data transmission terminal 122-1 and the load 20', and the control unit 122' communicates with the load 20' through the data transmission line 124'. The control unit 122' receives the reference voltage Vref and detects whether a communication signal Sn is received by the control unit 122' through the data transmission terminal 122-1. When the communication signal Sn is not received by the control unit 122', the control unit 122' controls the conversion unit 112 to provide the output voltage Vo with the fixed voltage value to the load 20. When the communication signal Sn is received by the control unit 122', the control unit 122' controls the conversion unit 112 to provide the output voltage Vo with an adjustable voltage value to the load 20', and therefore the voltage value of the output voltage Vo can be adjusted according to the communication signal Sn.

More specifically, since the control unit 122' is the PD (power delivery) controller, and meets the specifications of the USB power delivery communication protocol, the control unit 122' can be connected to a controller 202 with the power delivery function (represented by dotted lines) inside the load 20'. Therefore, the control unit 122' can be communicated with the controller 202 through the data transmission line 124'. For example, the control unit 122' informs the controller 202 that it (the control unit 122') can provide the output voltage Vo with different voltage values, such as 5 volts, 10 volts, 20 volts, or so on. Afterward, the load 20' informs the control unit 122' that it (the load 20') needs the voltage value of the output voltage Vo, such as but not limited to 10 volts through the communication signal Sn. After the control unit 122' receives the communication signal Sn, the control unit 122' outputs the control signal Sc to the conversion unit 112 according to the communication signal Sn, so that the conversion unit 112 is controlled by the control signal Sc to adjust the voltage value of the output voltage Vo to be 10 volts.

If the communication signal Sn is not received by the control unit 122' since the controller 202 of the load 20' is not the PD controller or the controller 202 fails to connected to the data transmission line 124', the control unit 122' still controls the conversion unit 112 to provide the output voltage Vo with the fixed voltage value to the load 20' according to the reference value Vref. Accordingly, the user does not need to additionally carry suitable adapter cables for different loads so that the adapter module 10-C is widely useful and adaptive.

In one embodiment, the control unit 122' can set the transmission time Tc like the control unit 122 shown in FIG. 2A. When the communication signal Sn is not received by the control unit 122' within the transmission time Tc, the control unit 122' controls the conversion unit 112 to provide the output voltage Vo with the fixed voltage value to the load 20'. When the communication signal Sn is received by the control unit 122' within the transmission time Tc, the control unit 122' controls the conversion unit 112 to provide the output voltage Vo with the adjustable voltage value to the load 20'. The detail description of other components and control manners like in FIG. 2A is not repeated here for the sake of brevity.

Figure 2D:
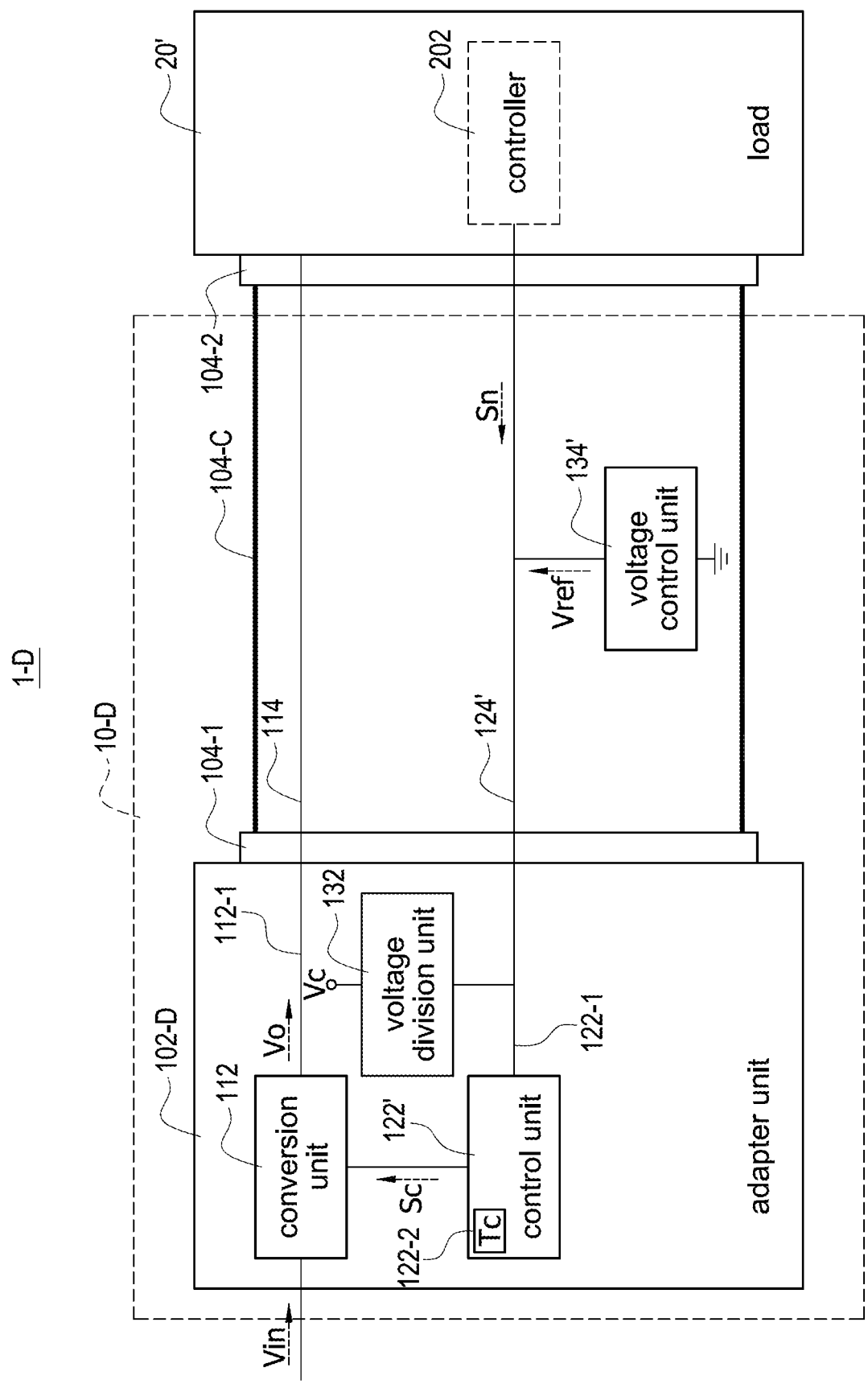
FIG. 2D is a schematic block diagram of the adapter module for supplying power to the load according to a fourth embodiment of the present disclosure.

Please refer to FIG. 2D, which shows a schematic block diagram of the adapter module for supplying power to the load according to a fourth embodiment of the present disclosure. Also refer to FIG. 1 to FIG. 2C. The difference between the adapter module 10-D shown in FIG. 2D and the adapter module 10-C shown in FIG. 2C is that the adapter unit 102-D includes a voltage source Vc and a voltage division unit 132. The voltage division unit 132 is coupled to the voltage source Vc and the data transmission terminal 122-1. The voltage control unit 134' is a passive voltage control unit, such as but not limited to a resistor. When the communication signal Sn is not received by the control unit 122', the control unit 122' controls the conversion unit 112 to provide the output voltage Vo with the fixed voltage value to the load 20 according to the voltage across the passive voltage control unit 134', namely the reference voltage Vref. When the communication signal Sn is received by the control unit 122', the control unit 122' controls the conversion unit 112 to provide the output voltage Vo with the adjustable voltage value to the load 20', and therefore the voltage value of the output voltage Vo can be adjusted according to the communication signal Sn. The detail description of other components and control manners like in FIG. 2C is not repeated here for the sake of brevity.

Figure 3:
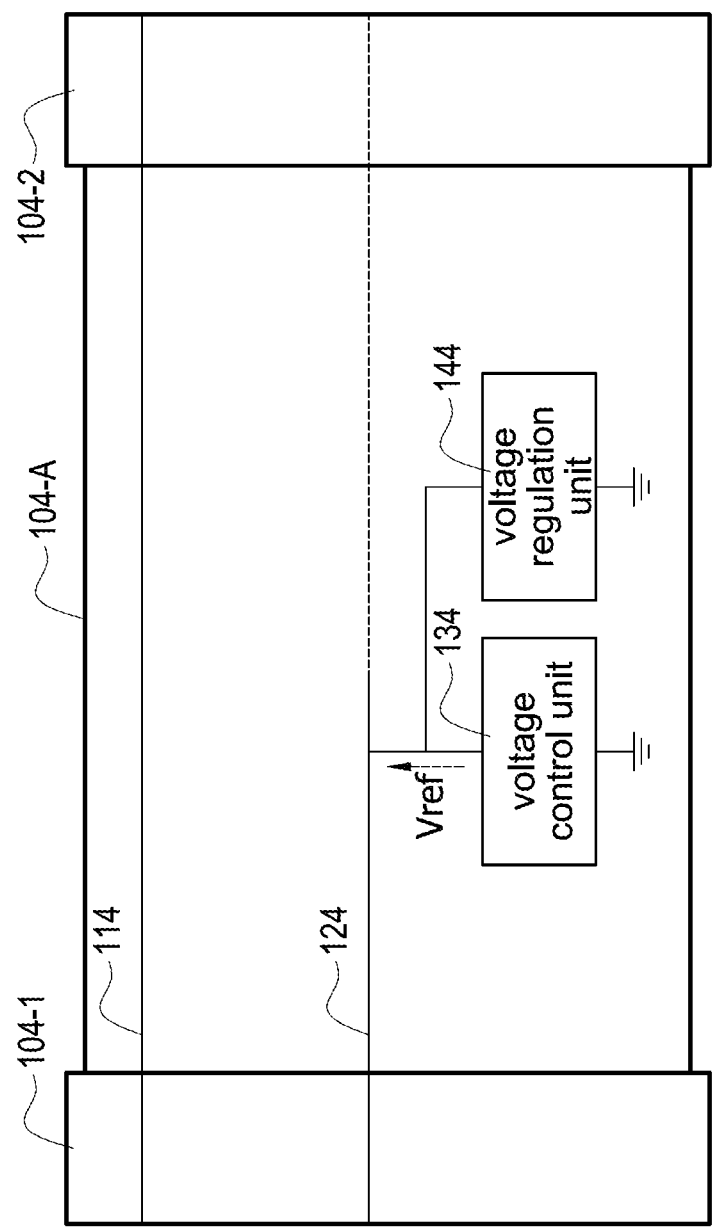
FIG. 3 is a schematic block diagram of an adapter cable and a voltage regulation unit according to the present disclosure.

Please refer to FIG. 3, which shows a schematic block diagram of an adapter cable and a voltage regulation unit according to the present disclosure. Also refer to FIG. 1 to FIG. 2D. The adapter cable 104 further includes a voltage regulation unit 144. The voltage regulation unit 144 is coupled between the voltage control unit 134 and a ground, and the voltage regulation unit 144 is provided to regulate the voltage value of the reference voltage Vref. In one embodiment, the voltage regulation unit 144 may be, for example but not limited to, a capacitor or a voltage regulation circuit. The voltage value of the reference voltage Vref is regulated by the voltage regulation unit 144 to make the voltage control unit 134 be able to provide the more stable reference voltage Vref, thereby making the control unit 122 to be less susceptible to misjudgment. In particular, the voltage regulation unit 144 can be provided to regulate the voltage value of the reference voltage Vref for the different adapter cables 104-A to 104-D shown in FIG. 2A to FIG. 2D.

Figure 4A:
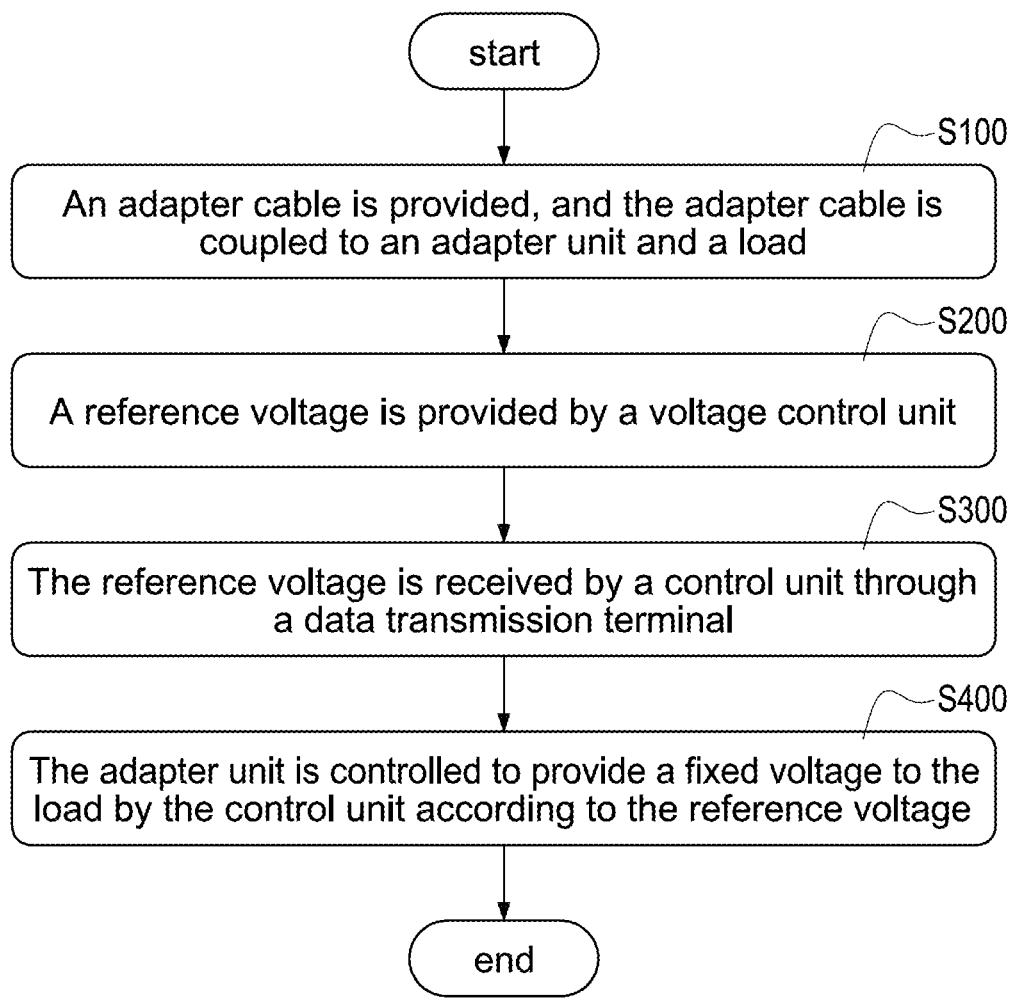
FIG. 4A is a flowchart of a method of operating an adapter module according to the present disclosure.

Please refer to FIG. 4A, which shows a flowchart of a method of operating an adapter module according to the present disclosure. Also refer to FIG. 1 to FIG. 3. The method includes steps as follows. First, an adapter cable is provided, and the adapter cable is coupled to an adapter unit and a load (S100). The adapter module 10 includes the adapter unit 102 and the adapter cable 104. The adapter cable 104 is coupled to the adapter unit 102 and the load 20. The adapter unit 102 is used to provide an output voltage Vo to supply the load 20. Afterward, a reference voltage is provided by a voltage control unit (S200). The adapter cable 104 includes an output bus line 114, a data transmission line 124, and a voltage control unit 134. The output bus line 114 is coupled between the output terminal 112-1 and the load 20. The data transmission line 124 is coupled between a data transmission terminal 122-1 and the voltage control unit 134, and the voltage control unit 134 is grounded. The voltage control unit 134 provides the reference voltage Vref to the data transmission line 124 and transmits the reference voltage Vref to the adapter unit 102 through the data transmission line 124.

In the step (S200), two manners may be implemented. The first manner is that the voltage control unit 134 is an active voltage control unit. The voltage control unit 134 is, for example but not limited to, an active voltage source, an active power supply unit, or an active switch switching circuit. Therefore, the accurate voltage value of the reference voltage Vref can be provided and the voltage value of the reference voltage Vref is not easily affected by external interference, such as the line coupling effect or the electromagnetic interference. The second manner is that the voltage control unit 134' is a passive voltage control unit, such as but not limited to a resistor. The voltage source Vc and the voltage division unit 132 of the adapter unit 102 are provided to make the voltage source Vc provide voltages across the voltage division unit 132 and the voltage control unit 134', and the voltage across the voltage control unit 134' is the reference voltage Vref. The passive voltage control unit 134' (such as but not limited to a resistor) is used to produce the reference voltage Vref, and therefore to reduce the cost of components to achieve the cost savings of the overall adapter module.

Afterward, the reference voltage is received by a control unit through a data transmission terminal (S300). The control unit 122 of the adapter unit 102 receives the reference voltage Vref through the data transmission terminal 122-1. The control unit 122 is a PD (power delivery) controller and meets the specifications of the USB power delivery communication protocol. Finally, the adapter unit is controlled to provide a fixed voltage to the load by the control unit according to the reference voltage (S400). The control unit 122 outputs a control signal Sc according to the reference voltage Vref to control a conversion unit 112 to provide the output voltage Vo with the fixed voltage value to the load 20. Therefore, the control unit 122 can provide the output voltage Vo with the fixed voltage value to the load 20 under the absence of the communication between the control unit 122 and the load 20 since the reference voltage Vref outputted from the voltage control unit 134 is provided to the control unit 122 which meets the specifications of the USB power delivery communication protocol.

Figure 4B:
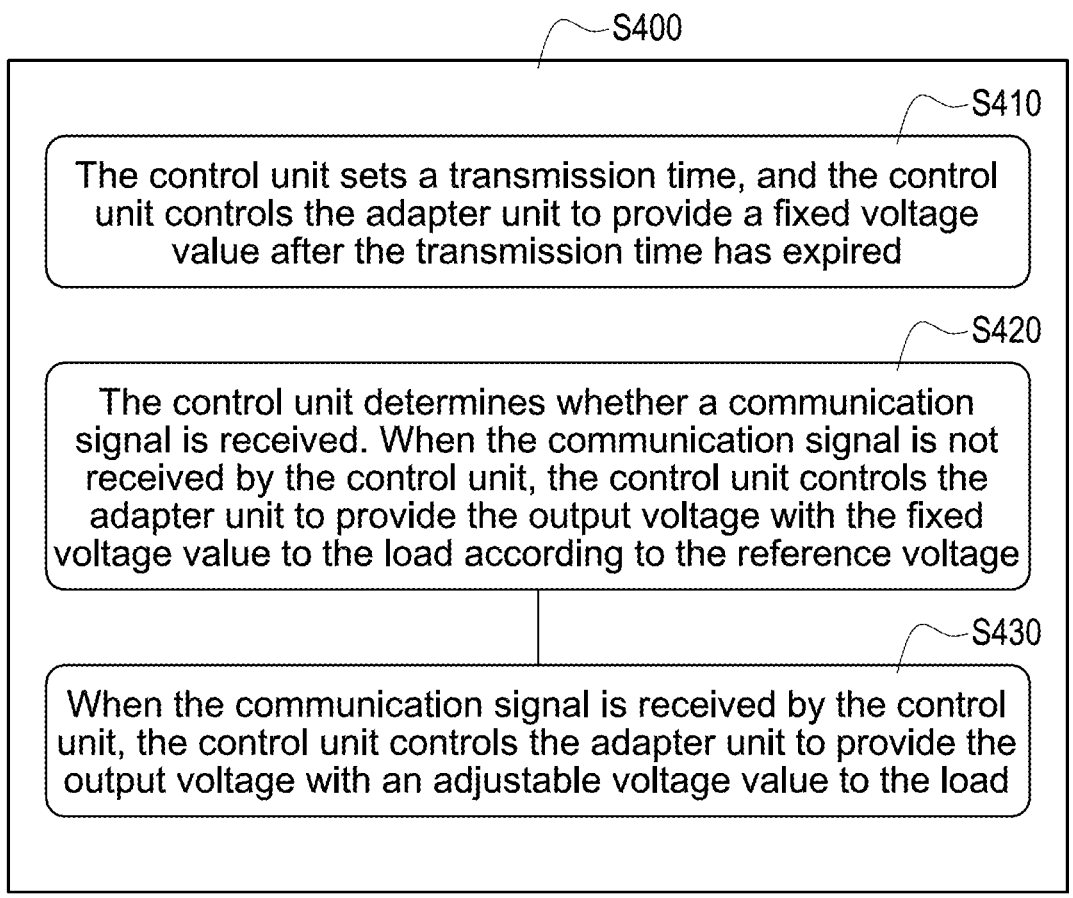
FIG. 4B is a flowchart of a method of operating an adapter unit by a control unit according to the present disclosure.

Please refer to FIG. 4B, which shows a flowchart of a method of operating an adapter unit by a control unit according to the present disclosure. Also refer to FIG. 1 to FIG. 4A. In the step (S400), different control manners are provided by the control units 122 to control the adapter unit 102 supplying power to the load 20. In one embodiment in the step (S400), the control unit sets a transmission time, and the control unit controls the adapter unit to provide the fixed voltage value after the transmission time has expired (S410). The control unit 122 sets a transmission time Tc by firmware or a setting unit 122-2, and the transmission time Tc meets the specifications of the USB power delivery communication protocol, such as but not limited to 200 microseconds. The voltage control unit 134 still provides the reference voltage Vref, such as 1.7 volts to the control unit 122. After the transmission time Tc, which meets the specifications of the USB power delivery communication protocol, has expired, the control unit 122 outputs the control signal Sc according to the reference voltage Vref, such as 1.7 volts provided from the voltage control unit 134 when the control unit 122 does not still acquire the response from the load 20. When the conversion unit 112 receives the control signal Sc outputted from the control unit 122, the conversion unit 112 converts the input voltage Vin into the output voltage Vo with the fixed voltage value, such as 19.5 volts according to the control signal Sc.

In another embodiment in the step (S400), the control unit determines whether the communication signal is received. When the communication signal is not received by the control unit, the control unit controls the adapter unit to provide the output voltage Vo with the fixed voltage value to the load according to the reference voltage (S420). The control unit 122 receives the reference voltage Vref and detects whether the communication signal Sn is received by the control unit 122 through the data transmission terminal 122-1. When the communication signal Sn is not received by the control unit 122, the control unit 122 controls the conversion unit 112 to provide the output voltage Vo with the fixed voltage value to the load 20 according to the reference voltage Vref provided from the voltage control unit 134. Afterward, when the communication signal Sn is received by the control unit, the control unit controls the adapter unit to provide the output voltage with the adjustable voltage value to the load (S430). When control unit 122 detects that the communication signal Sn is received, the control unit 122 controls the conversion unit 112 to provide the output voltage Vo with the adjustable voltage value to the load 20, and therefore the voltage value of the output voltage Vo can be adjusted according to the communication signal Sn.

In the step (S420) and the step (S430), the control unit 122 can set the transmission time Tc like the control unit 122 disclosed in the step (S410). When the communication signal Sn is not received by the control unit 122 within the transmission time Tc, the control unit 122 controls the conversion unit 112 to provide the output voltage Vo with the fixed voltage value to the load 20. When the communication signal Sn is received by the control unit 122 within the transmission time Tc, the control unit 122 controls the conversion unit 112 to provide the output voltage Vo with the adjustable voltage value to the load 20.

More specifically, detailed description of the foregoing step (S400) will be made hereinafter with reference to FIG. 5, FIG. 6A, FIG. 6B, FIG. 7A, and FIG. 7B.

Figure 5:
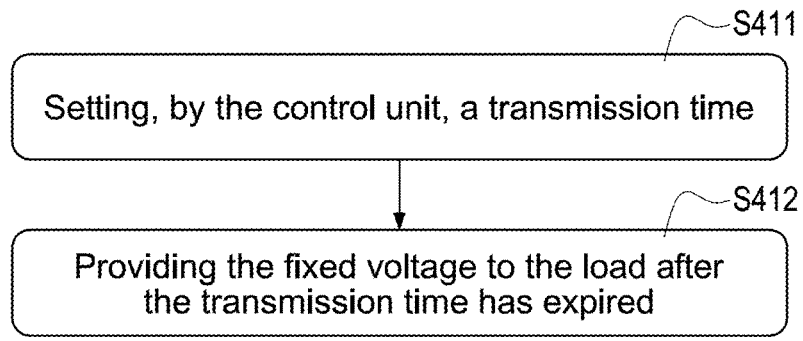
FIG. 5 is a flowchart of providing a fixed voltage to a load after a transmission time has expired according to the present disclosure.

Please refer to FIG. 5, which shows a flowchart of providing a fixed voltage to a load 20 after a transmission time Tc has expired according to the present disclosure, as mentioned in the step (S410) shown in FIG. 4B. First, setting, by the control unit 122, a transmission time Tc (S411). Afterward, providing the fixed voltage to the load 20 after the transmission time Tc has expired (S412).

Figure 6A:
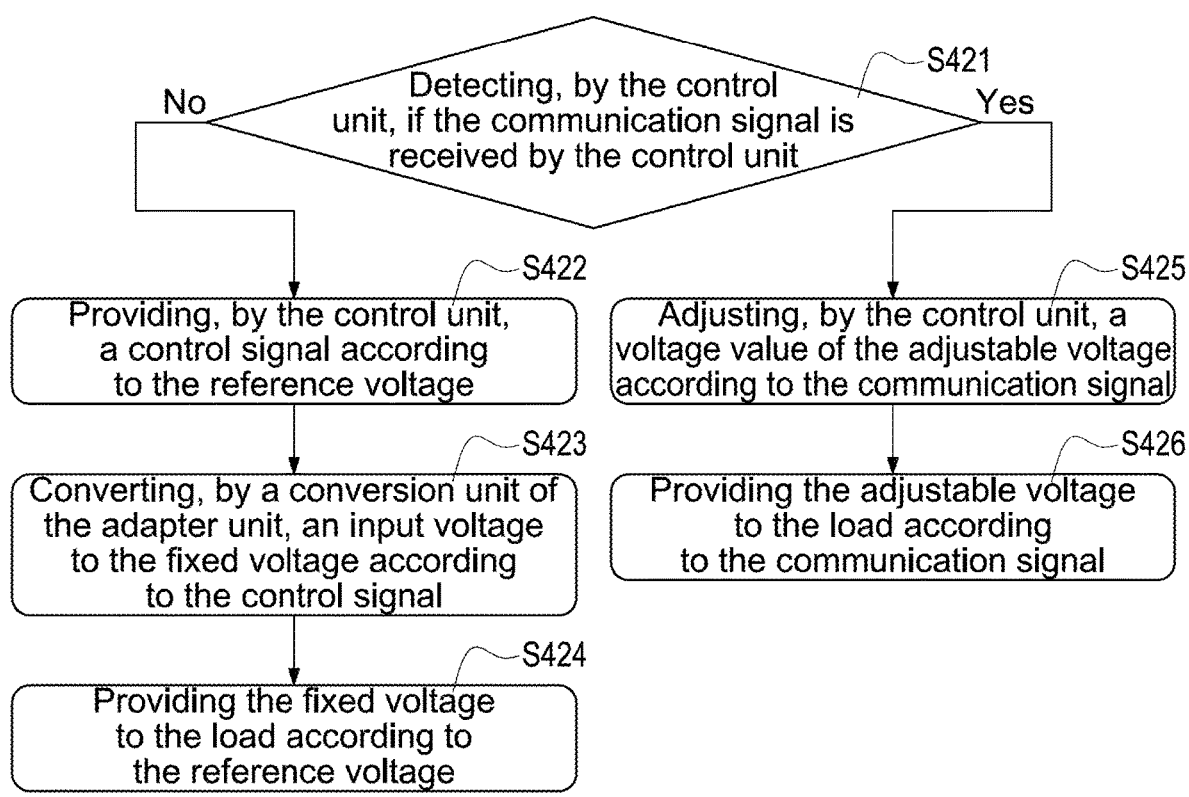
FIG. 6A and FIG. 6B are flowcharts of providing the fixed voltage or an adjustable voltage to the load according to a first embodiment of the present disclosure.
Figure 6B:
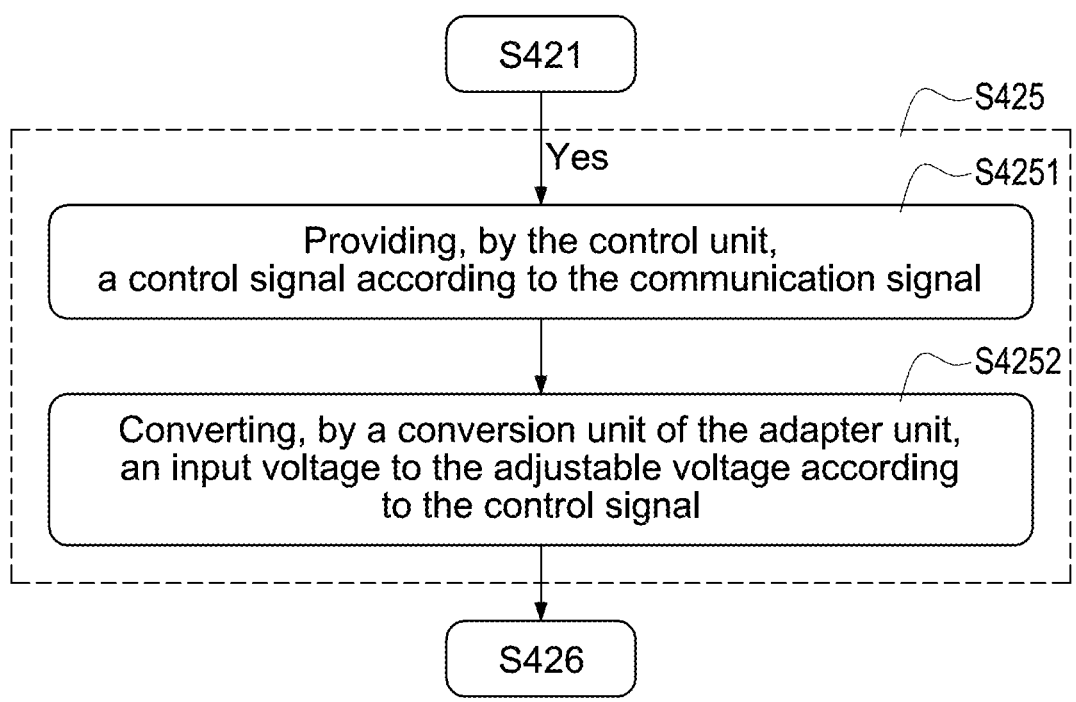

Please refer to FIG. 6A and FIG. 6B, which show flowcharts of providing the fixed voltage or an adjustable voltage to the load 20 according to a first embodiment of the present disclosure. As shown in FIG. 6A, first, detecting, by the control unit 122, if the communication signal Sn is received by the control unit 122 (S421). If "No" in the step (S421), providing, by the control unit 122, a control signal Sc according to the reference voltage Vref (S422). Afterward, converting, by a conversion unit 112 of the adapter unit 102, an input voltage Vin to the fixed voltage according to the control signal Sc (S423). Finally, providing the fixed voltage to the load 20 according to the reference voltage Vref (S424).

If "Yes" in the step (S421), first adjusting, by the control unit 122, a voltage value of the adjustable voltage according to the communication signal Sn (S425), and afterward providing the adjustable voltage to the load 20 according to the communication signal Sn (S426).

As shown in FIG. 6B, the step (S425) further includes the steps of: first providing, by the control unit 122, a control signal Sc according to the communication signal Sn (S4251), and afterward converting, by a conversion unit 112 of the adapter unit 102, an input voltage Vin to the adjustable voltage according to the control signal Sc (S4252). In particular, if the communication signal Sn is received by the control unit 122 in the step (S421), a voltage value of the adjustable voltage can be adjusted. Therefore, the step (S425) is performed after the step (S421) and before the step (S426), i.e., adjusting, by the control unit 122, the voltage value of the adjustable voltage according to the communication signal Sn (S425).

Figure 7A:
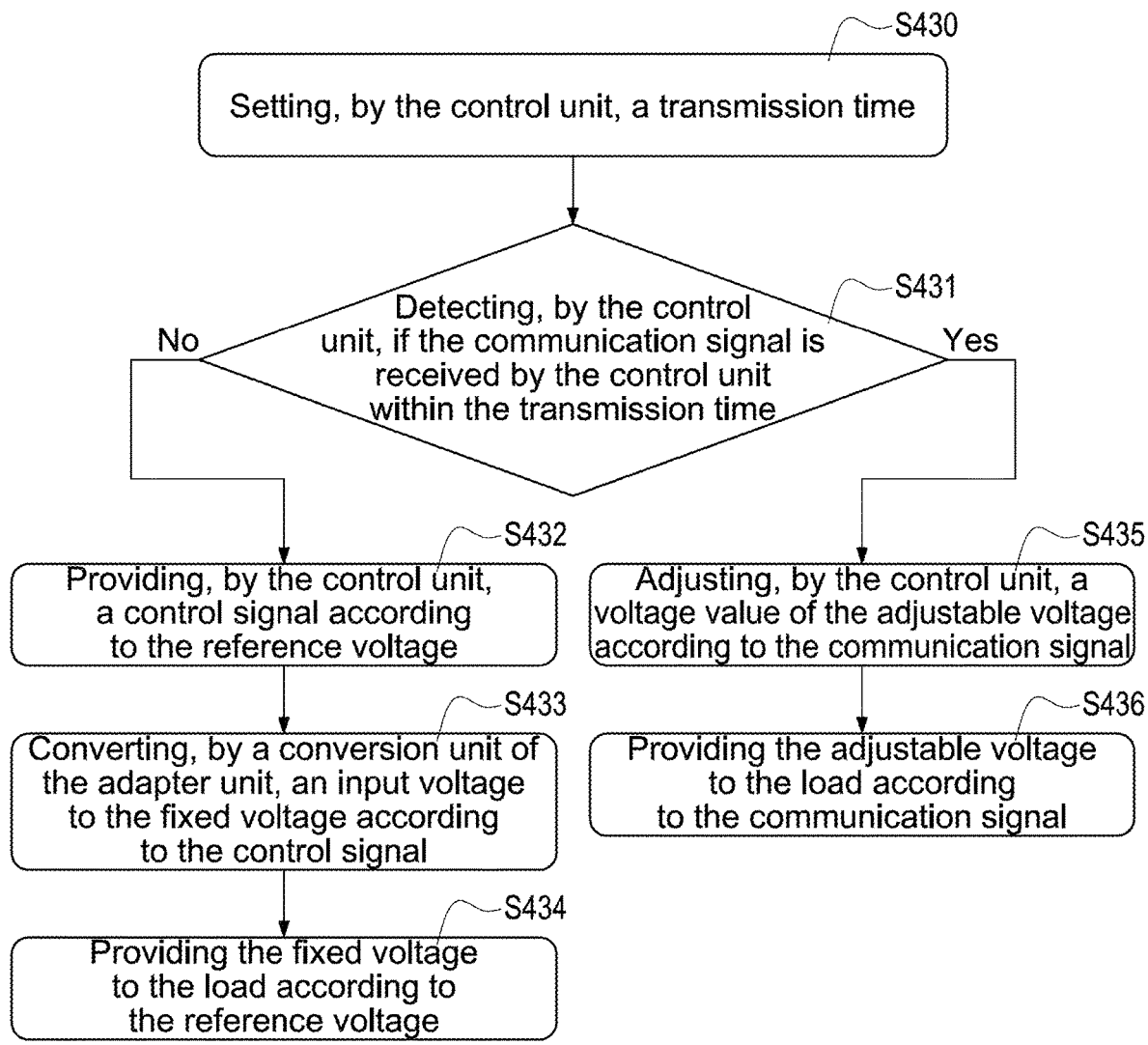
FIG. 7A and FIG. 7B are flowcharts of providing the fixed voltage or the adjustable voltage to the load according to a second embodiment of the present disclosure.
Figure 7B:
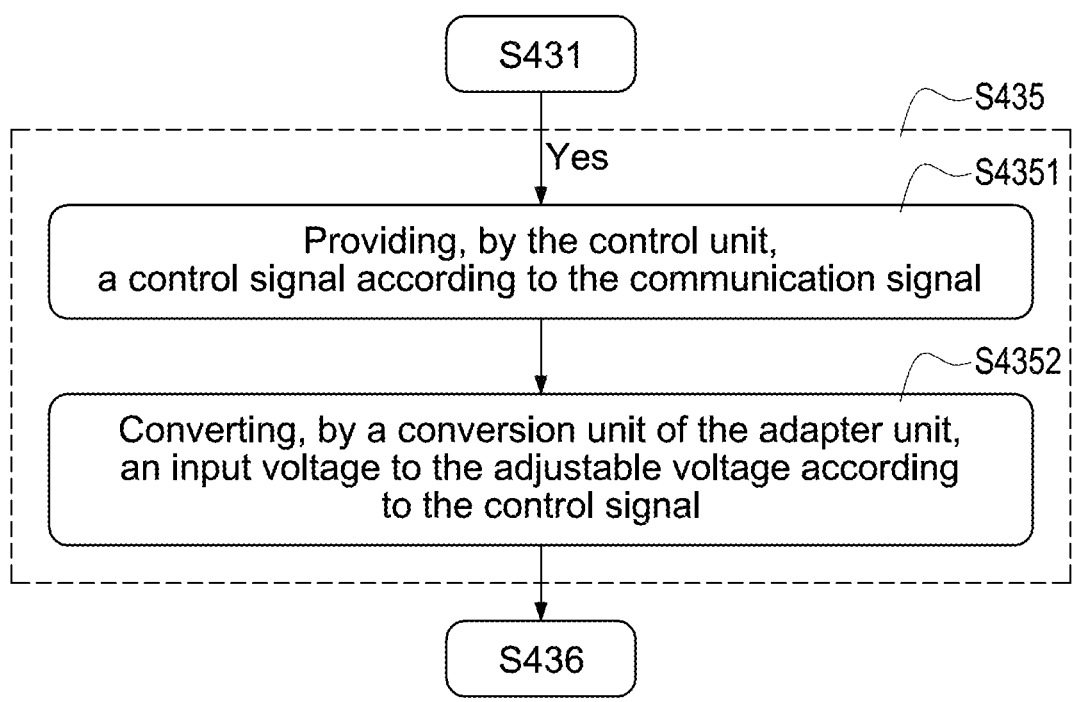

Please refer to FIG. 7A and FIG. 7B, which show flowcharts of providing the fixed voltage or the adjustable voltage to the load 20 according to a second embodiment of the present disclosure. The second embodiment is similar to the first embodiment shown in FIG. 6A and FIG. 6B, however, the major difference is that a transmission time Tc is introduced in the former. As shown in FIG. 7A, first, setting, by the control unit 122, a transmission time Tc (S430). Afterward, detecting, by the control unit 122, if the communication signal Sn is received by the control unit 122 within the transmission time Tc (S431). Further, the successive steps (S432)-(S436) are correspondingly the same as steps (S422)-(S426) shown in FIG. 6A and FIG. 6B, the detail description of these steps is not repeated here for the sake of brevity.

In conclusion, the present disclosure has following features and advantages:

1. According to the reference voltage provided from the voltage control unit, the control unit can control the conversion unit to provide the output voltage with the fixed voltage value so that the load can obtain the required voltage outputted from the adapter module even if the load does not have the function of USB power delivery communication protocol.

2. The active voltage control unit is used to provide the accurate voltage value of the reference voltage and the reference voltage is not easily affected by external interference, such as the line coupling effect or the electromagnetic interference.

3. The passive voltage control unit is used to reduce the cost of components to achieve the cost savings of the overall adapter module.

4. If the controller of the load does not have the function of USB power delivery communication protocol, the control unit can control the conversion unit to provide the output voltage with the fixed voltage value or with the adjustable voltage value according to the reference voltage, and accordingly the user does not need to additionally carry suitable adapter cables for different loads so that the adapter module is widely useful and adaptive.

5. The voltage value of the reference voltage is regulated by the voltage regulation unit to make the voltage control unit be able to provide the more stable reference voltage, thereby making the control unit to be less susceptible to misjudgment.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An adapter module configured to couple to a load and supply power to the load, the adapter module comprising:
    an adapter unit comprising a control unit having a data transmission terminal, wherein the control unit is a power delivery controller; and
    an adapter cable comprising:
        an output bus line coupled to the adapter unit and the load, and configured to provide an adjustable voltage or a fixed voltage to the load according to an instruction of the control unit;
        a data transmission line coupled to the data transmission terminal; and
        a voltage control unit coupled to the data transmission line, and configured to provide a reference voltage,
    wherein when the load without a power delivery controller is coupled to the adapter cable, the control unit is configured to receive the reference voltage provided by the data transmission line through the data transmission terminal, and the control unit is configured to control the adapter unit, in a situation without communication with the load, to provide the fixed voltage required for an operation of the load, to the load according to the reference voltage as non-digital communication signals provided by the data transmission line; wherein a voltage value of the fixed voltage is higher than a voltage value of a default state of a USB power delivery communication protocol.

2. The adapter module of claim 1, wherein the control unit is further configured to set a transmission time and to control the adapter unit to provide the fixed voltage to the load after the transmission time has expired.

3. The adapter module of claim 1, wherein the data transmission line is coupled to the load, and wherein the control unit is further configured to detect a communication signal through the data transmission terminal and to control the adapter unit to:
   a) if the communication signal is not received by the control unit, provide the fixed voltage to the load according to the reference voltage; and
   b) if the communication signal is received by the control unit, provide the adjustable voltage to the load.

4. The adapter module of claim 3, wherein the control unit is further configured to adjust a voltage value of the adjustable voltage according to the communication signal.

5. The adapter module of claim 3, wherein the adapter unit further comprises a conversion unit coupled to the control unit, wherein the control unit is configured to provide a control signal to the conversion unit according to the reference voltage or the communication signal, and wherein the conversion unit is configured to convert an input voltage to the fixed voltage or convert the input voltage to the adjustable voltage according to the control signal.

6. The adapter module of claim 1, wherein the data transmission line is coupled to the load, and wherein the control unit is configured to set a transmission time, detect a communication signal through the data transmission terminal, and control the adapter unit to:
   a) if the communication signal is not received by the control unit within the transmission time, provide the fixed voltage to the load according to the reference voltage; and
   b) if the communication signal is received by the control unit within the transmission time, provide the adjustable voltage to the load.

7. The adapter module of claim 6, wherein the transmission time is 200 microseconds.

8. The adapter module of claim 1, wherein one end of the adapter cable is a Type-C connection port and the data transmission line is coupled to the data transmission terminal through the Type-C connection port.

9. The adapter module of claim 1, wherein the adapter cable further comprises a voltage regulation unit coupled to the voltage control unit, and wherein the voltage regulation unit is configured to regulate a voltage value of the reference voltage.

10. The adapter module of claim 1, wherein the adapter unit further comprises:
   a voltage source; and
   a voltage division unit coupled to the voltage source and the data transmission terminal, wherein the voltage source is configured to provide voltages across the voltage division unit and the voltage control unit, and the reference voltage is the voltage across the voltage control unit.

11. An adapter cable, comprising:
   an output bus line coupled to an adapter unit and a load, and configured to provide an adjustable voltage or a fixed voltage to the load according to an instruction of a control unit of the adapter unit;
   a data transmission line configured to couple to the adapter unit; and
   a voltage control unit coupled to the data transmission line,
   wherein when the load without a power delivery controller is coupled to the adapter cable, the voltage control unit is configured to provide a reference voltage to the data transmission line for use by the adapter unit, in a situation without communication with the load, to instruct an output of the fixed voltage, required for an operation of the load, to the load wherein the reference voltage is a non-digital communication signal provided by the data transmission line; wherein a voltage value of the fixed voltage is higher than a voltage value of a default state of a USB power delivery communication protocol.

12. The adapter cable of claim 11, wherein one end of the adapter cable is a Type-C connection port configured to couple the data transmission line to the adapter unit through the Type-C connection port.

13. The adapter cable of claim 11, further comprising a voltage regulation unit coupled to the voltage control unit, wherein the voltage regulation unit is configured to regulate a voltage value of the reference voltage.

14. The adapter cable of claim 11, wherein the reference voltage is a voltage across the voltage control unit.

15. A method of operating an adapter module, the method comprising the steps of:
   (a) coupling an adapter cable to an adapter unit and a load so that an output bus of the adapter cable provides an adjustable voltage or a fixed voltage to the load according to an instruction from a control unit of the adapter unit;
   (b) providing, by a voltage control unit of the adapter cable, a reference voltage, wherein the reference voltage is a voltage across the voltage control unit;
   (c) receiving, by a control unit of the adapter unit, the reference voltage through a data transmission terminal, wherein the control unit is a power delivery controller; and
   (d) when a load without a power delivery controller is coupled to the adapter cable, determining, by the control unit, to provide the fixed voltage required for an operation of the load to the load in a situation without communication with the load according to the reference voltage as non-digital communication signals provided by a data transmission line of the adapter cable, or to provide the adjustable voltage to the load; wherein a voltage value of the fixed voltage is higher than a voltage value of a default state of a USB power delivery communication protocol.

16. The method of operating the adapter module of claim 15, wherein step (d) further comprises:
   (d-1) setting, by the control unit, a transmission time; and
   (d-2) providing the fixed voltage to the load after the transmission time has expired.

17. The method of operating the adapter module of claim 15, wherein step (d) further comprises:
   (d-i) detecting, by the control unit, if a communication signal is received by the control unit;
   (d-ii) if the communication signal is not received by the control unit, providing the fixed voltage to the load according to the reference voltage; and
   (d-iii) if the communication signal is received by the control unit, providing the adjustable voltage to the load according to the communication signal.

18. The method of operating the adapter module of claim 17, wherein step (d-iii) further comprises adjusting, by the control unit, a voltage value of the adjustable voltage according to the communication signal.

19. The method of operating the adapter module of claim 17, wherein step (d-ii) or step (d-iii) further comprises:
- (d-iii-1) providing, by the control unit, a control signal according to the reference voltage or the communication signal; and
- (d-iii-2) converting, by a conversion unit of the adapter unit, an input voltage to the fixed voltage or the adjustable voltage according to the control signal.

20. The method of operating the adapter module of claim 17, wherein step (d) further comprises:
- (d-1) setting, by the control unit, a transmission time;
- (d-2a) if the communication signal is not received by the control unit within the transmission time, providing the fixed voltage to the load according to the reference voltage; and
- (d-2b) if the communication signal is received by the control unit within the transmission time, providing the adjustable voltage to the load according to the communication signal.

* * * * *